Feb. 10, 1959
T. J. LAUROESCH
2,873,381
ROTARY SCANNING DEVICE
Filed Aug. 29, 1957
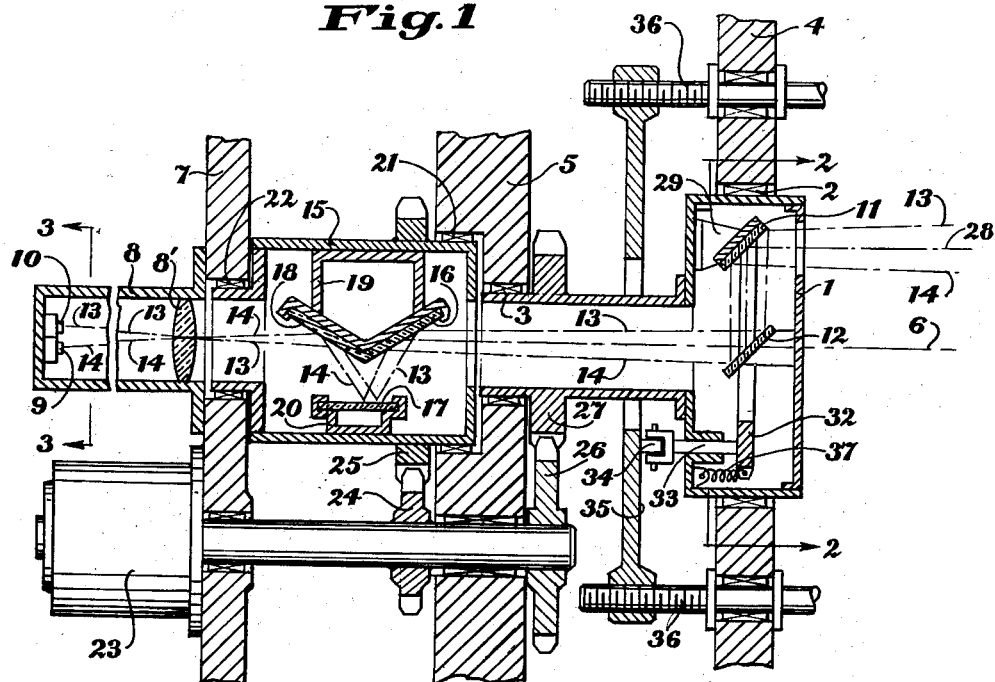
Fig.1
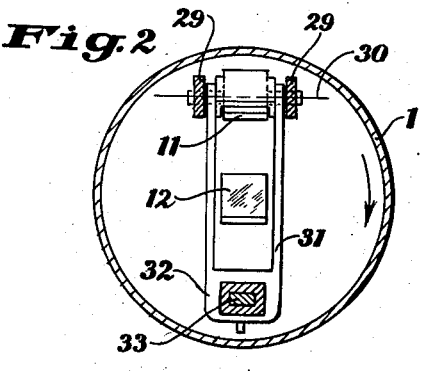
Fig.2
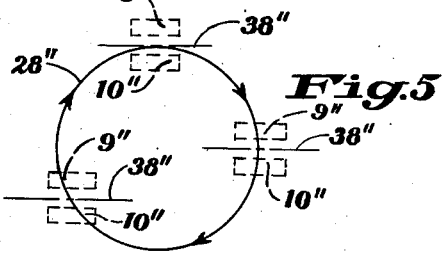
Fig.3
Fig.4
Fig.5
Thomas J. Lauroesch
INVENTOR.
BY
ATTORNEYS United States Patent Office 2,873,381
Patented Feb. 10, 1959

2,873,381

ROTARY SCANNING DEVICE

Thomas J. Lauroesch, Rochester, N. Y., assignor, by mesne assignments, to the United States of America as represented by the Secretary of the Navy Application August 29, 1957, Serial No. 681,151

2 Claims. (Cl. 250—236)

This invention relates to a rotary scanning device of the type used in target detection systems for the control of guided missiles or other aircraft.

It is an object of this invention to provide a scanning device provided with a plurality of radiant energy detecting elements, arranged in a predetermined relationship relative to one another and in which means is provided for effectively moving images of the detecting units along a predetermined circular or spiral scanning path in any object plane being scanned while at the same time maintaining the effective images at all times in a predetermined relationship to said scanning path.

Further objects will become apparent from the following description and claims, especially when taken in the light of the accompanying drawings wherein:

Fig. 1 is a longitudinal section through a scanner embodying the invention;

Fig. 2 is a fragmentary section taken on the line 2—2 of Fig. 1;

Fig. 3 is a fragmentary section taken on the line 3—3 of Fig. 1; and

Figs. 4 and 5 are diagrammatic views illustrating the operation of the invention.

While, as will be apparent, the invention can be embodied in scanners of various physical constructions, for purposes of illustration it is shown in Fig. 1 as comprising a scanning head 1, mounted in suitable bearings 2 and 3 carried by fixed supports 4 and 5, so that the head is rotatable about an axis 6. Spaced axially rearwardly from the scanner head 1 and rigidly carried by a fixed support 7 is a detector housing 8 within which are carried a suitable image forming system such as a lens 8' and a pair of energy sensing elements or detectors 9 and 10. As is clearly shown in Figs. 1 and 3, these detectors are mounted closely adjacent to the axis 6 and on opposite sides thereof. Detectors 9 and 10 may, for example, be bolometers, sensitive to infrared energy or photoelectric elements, sensitive to light rays, depending upon the particular intended mode of operation of the scanning means.

The head 1 carries a pair of reflectors 11 and 12, reflector 11 being spaced radially outward from the axis 6 and reflector 12 being located on said axis. These reflectors are so positioned relative to one another and to the axis 6 that their reflecting surfaces reflect rays of radiant energy, such as those designated by the dash lines 13 and 14, impinging upon reflector 11, generally along the axis of the assembly toward the detectors 9 and 10.

Interposed in the path of the rays 13, 14 between the head and the detectors 9, 10 is an image derotator 15. This derotator carries within it three reflectors 16, 17 and 18 mounted by suitable brackets 19 and 20 and so arranged relative to one another as to reverse or invert the relative position of the rays 13, 14 as they are serially reflected thereby, and then to redirect them, through the lens 8', to the detectors 9 and 10. The derotator 15 is mounted for rotation about the axis 6 by means of bearings 21 and 22 carried by the members 5 and 7. Both the scanning head 1 and the derotator 15 are adapted to be simultaneously rotated, as by means of a motor 23 acting through suitable gearing 24, 25, 26 and 27. The arrangement of gearing should be such that the derotator will be rotated in the same direction about the axis 6 as is the scanning head 1, but at one half of the angular rate. By changing the angular relationship of reflectors 11 and 12 relative to one another it is possible to vary the effective radius of the scanning path in any given object plane ahead of the scanner and, by gradually changing this angular relationship during the rotation of the scanner, a scanning path of spiral configuration can be produced. To permit this type of operation, reflector 11 has been illustrated as being pivotally mounted by a suitable U-shaped bracket 29 so that it may be adjusted about the axis 30 (see Fig. 2), and is provided with a U-shaped lever arm 32, straddling the reflector 12 as shown in Fig. 2 and arranged so that its free end is in engagement with the inner end of a plunger 33 slidably mounted in the head 1. Plunger 33 carries, on its outer end, a roller 34, adapted to ride on the forward surface of a suitable adjusting plate 35 which, as shown in this figure, is carried by a plurality of threaded shafts 36 so that, by conjoint operation of the shafts 36, the plate 35 may be moved toward or away from the scanning head 1. A suitable spring 37 may be provided to urge the lower end of lever 32 into continuous contact with the inner end of plunger 33. With this arrangement, movement of the adjusting plate 35 toward the head 1 will cause the effective scanning path in any object plane to move outwardly whereas movement in the other direction will tend to shift the scanning path inwardly toward the axis 6.

As indicated in Fig. 1 ray 13 is representative of the rays emanating from a point ahead of the scanner and lying somewhat outside of the mean scanning path generated by the line 28. Detectors 9 and 10 are located substantially in the focal plane of lens 8' so that it will cause ray 13 together with other rays emanating from this point to converge onto detector 10. Ray 14, on the other hand, is representative of the rays emanating from a point ahead of the scanner but lying somewhat inside the mean scanning path and, as indicated in Fig. 1 lens 8' will bring such rays into focus on detector element 9.

Derotator 15 serves to ensure that rays, such as ray 13, emanating from outside the mean scanning path, will always be above the axis 6 at the plane of the detectors 9 and 10 whereas rays, such as 14, emanating from inside the mean scanning path, will always be below the axis 6 at the plane of the detectors 9 and 10, despite the rotational movement of the head 1 about axis 6. In other words, images of objects lying ahead of the scanner and somewhat outside the mean scanning path will fall only on detector 10, while those of objects inside the mean scanning path will fall only on detector 9. These images will, of course, sweep across the respective detector as the head rotates. Thus, the effect is the same as if, in any particular object plane ahead of the scanner, images 9' and 10' of the detectors were swept about a circular path 28' as indicated by the arrows and dotted lines shown in Fig. 4. Image 9' will sweep across any object disposed slightly inwardly of the line 28' while image 10' will sweep across any object disposed slightly outwardly of line 28'. A horizontal reference line 38 (see Fig. 3) intersecting the axis 6 between the detectors 9 and 10 will at all times appear to be tangent to the path 28. Varying the angle of reflector 11 by actuation of shafts 36 will increase or decrease the radius of the scanning circle in any given plane but will in no way alter the relationship of the images 9' and 10' to one another or to the path.

Without the derotator 15, on the other hand, a scanning pattern such as is diagrammatically illustrated in Fig. 5 would obtain. It will be observed that under such conditions image 10" of detector 10 would always be directly below image 9" of detector 9 and that the relationship of these images and the image 38" of reference line 38 to the path 28" would be constantly changing. Moreover, an object slightly inside the path 28" might be scanned, depending upon its angular position, by either image 9" or image 10" or sequentially by both, in either order. The output from the detectors with such an arrangement would obviously require a much more complicated signal analyzer to obtain a useable indication of the exact location of any object.

Operation of the scanning devices is believed to be obvious from the above description. During scanning the head 1 and derotator 15 are rotated about axis 6, the derotator at half the rate of the head, so as to effectively sweep the images of detectors 9 and 10 along the desired scanning path. As previously explained the effective radius of this path in any particular plane ahead of the scanner will depend upon the relative angle between reflectors 11 and 12. By varying this angle, by means of simultaneous actuation of screw shafts 36, the effective radius can be altered during rotation of the scanner, causing a spiral scanning path to be generated. In any event, the derotator 15 will serve to effectively maintain the relationship of the images 9' and 10' of the detectors 9 and 10 to the scanning path constant at all times. The signals resulting from one of these images sweeping across an object ahead of the scanner can thus be readily converted into a form which will permit accurate location of the object relative to the craft carrying the scanner.

While a particular construction of scanning device has been illustrated, it will be obvious to those skilled in the art that the invention may be applied to scanners of other construction without departing from the principle of operation. Obviously, many arrangements can be used to provide for adjusting the relative angle between reflectors 11 and 12 while the head is rotating. Moreover, while the various reflectors have been shown as mirrors, it is obvious that suitable prisms may be substituted for one or all of these reflectors. However, particularly where it is desired to sense infrared energy, a highly polished reflecting surface is frequently more efficient than a prism, since there will be less absorption of the energy. Many other changes in the specific construction can obviously be made without departing from the spirit and scope of the invention as defined by the appended claims.

I claim:

1. A scanning system comprising a scanning head mounted for rotation about a predetermined axis, a pair of energy detectors located adjacent said axis on opposite sides thereof and spaced longitudinally of said axis from said scanning head, said scanning head including a first energy reflecting surface offset laterally from said axis and arranged to sweep about said axis upon rotation of said scanning head and to direct rays of energy intercepted thereby during such rotation generally radially toward said axis, and a second energy reflecting surface positioned on said axis and arranged to direct said rays reflected by said first surface generally along said axis toward said detectors, a derotator located in the path of said rays between said scanning head and said detectors and mounted for rotation about said axis, said derotator comprising an odd number of serially arranged energy reflecting surfaces adapted to intercept and mutually reverse the relative position of said rays and to redirect them generally along said axis toward said detectors, and means for conjointly rotating said scanning head at one rate and said derotator in the same direction but at one half said rate.

2. A scanning system as in claim 1 wherein at least one of the energy reflecting surfaces carried by said head is adjustably mounted thereon, and means for shifting the position of said last mentioned surface to vary the effective scanning field of said head.

References Cited in the file of this patent

UNITED STATES PATENTS

| | | |
|---|---|---|
| 2,447,344 | Kliever | Aug. 17, 1948 |
| 2,457,543 | Goldsmith | Dec. 28, 1948 |
| 2,855,521 | Blackstone | Oct. 7, 1958 |